Oct. 2, 1923.

W. D. GIDDINGS 1,469,505

DRAWBAR FOR VEHICLES

Filed April 8, 1922

Inventor
William D. Giddings,
By Samuel Herrick,
Attorney

Patented Oct. 2, 1923.

1,469,505

UNITED STATES PATENT OFFICE.

WILLIAM D. GIDDINGS, OF FORT PIERRE, SOUTH DAKOTA.

DRAWBAR FOR VEHICLES.

Application filed April 8, 1922. Serial No. 550,744.

*To all whom it may concern:*

Be it known that I, WILLIAM D. GIDDINGS, a citizen of the United States, residing at Fort Pierre, in the county of Stanley and State of South Dakota, have invented certain new and useful Improvements in Drawbars for Vehicles, of which the following is a specification.

This invention relates to a draw-bar for vehicles and more particularly to a drawbar by means of which one automobile may be towed behind another and the rear automobile rendered self-steering.

Further objects and advantages of the invention will be set forth in the detailed description which follows.

In the accompanying drawing.

Like numerals designate corresponding parts in all of the figures of the drawing.

Figure 1:
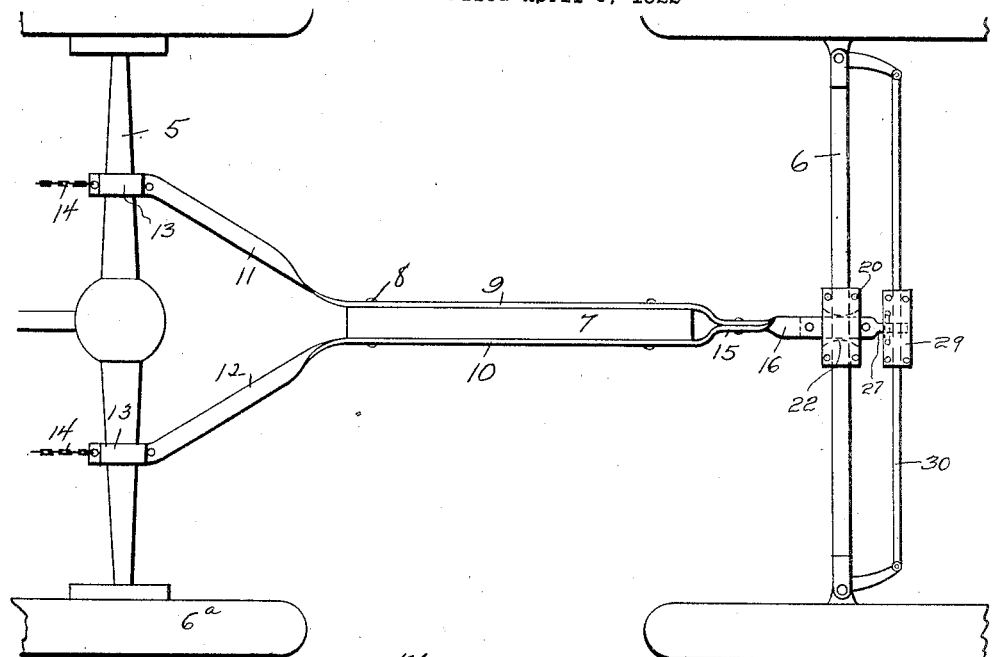
Fig. 1 is a plan view of the draw-bar constructed in accordance with the invention showing the same associated with the rear axle of one automobile and the front axle of another automobile.
Figure 2:
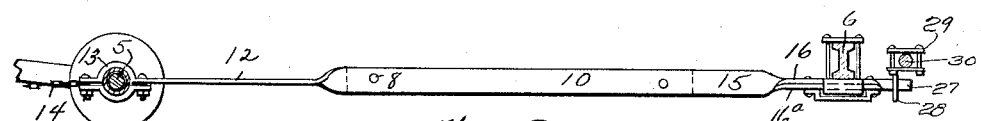
Fig. 2 is a side elevation of the draw-bar with the axles of the vehicles shown in section.
Figure 3:
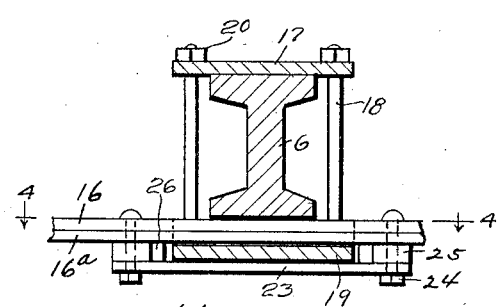
Fig. 3 is an enlarged vertical sectional view through the front axle of the rear automobile.
Figure 4:
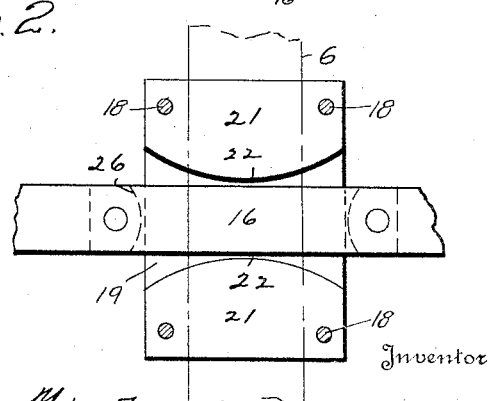
Fig. 4 is a horizontal sectional view upon line 4—4 of Fig. 3.

Referring to the drawing 5 designates the rear axle of a front or towing automobile and 6 the front axle of an automobile to be towed. The draw-bar comprises a filling block 7 which is bound by rivets or bolts 8 between straps 9 and 10. These straps diverge at their front ends, as indicated at 11 and 12 and at their front extremities are secured by clamps 13 to the axle 5. If desired, chains 14 may be extended forwardly from the clamps 13 and attached to the front axle (not shown) of the front automobile. However, this is not essential. When employed the chains 14 distribute the pulling strain between the front and rear axles of the front automobile. The rear portions of the straps 9 and 10 are brought together at 15 and are then bent at right angles to form flat horizontal portions 16—16ª, which portions are mounted for lateral rocking movement in a hanger clamp consisting of a flat plate 17, vertical bolts 18 and a bottom plate 19. Nuts 20 upon the upper ends of the bolts 18 provide means for binding the hanger clamp upon the axle 6 but the bottom plate 19 is limited in its movement toward the underside of the axle 6 by the presence of filling blocks 21, see Fig. 4. These filling blocks have arcuate faces 22 against which the side edges of the portions 16—16ª act. A strap 23 is secured by bolts or other fastening devices 24 to the underside of the portions 16—16ª and moves therewith. Filling blocks 25 are disposed between this strap and the portion 16ª and these filling blocks have arcuate faces 26 which act against the adjacent edges of the bottom plate 19, though it is to be understood that there is sufficient play between these filling blocks and the edges of said plate 19 to permit of the part 16 rocking laterally between the bottom plate and the underside of the axle 6. This lateral rocking movement is utilized to effect a steering of the rear automobile. To this end the parts 16—16ª are reduced to form a tongue 27 which projects through a staple-like element 28, said element being carried by a clamp 29 which is clamped upon the laterally extending steering rod 30 of the rear automobile. Thus if the front automobile turns to the right the forward part of the draw-bar will be drawn toward the right and the reduced portion 27 will be rocked toward the left. This will turn the front or steering wheels 6ª of the rear automobile in a direction to cause the rear vehicle to track behind the front vehicle. It is particularly to be noted that the filling blocks with their arcuate faces provide a structure whereby what is in effect a pivotal mounting of the parts 16—16ª with respect to the axle 6 is effected but this without the necessity of drilling a hole in said axle or otherwise changing the construction of the same.

It is to be understood that the invention is not limited to the precise construction set forth but that it includes within its purview whatever changes fairly come within either the terms or the spirit of the appended claim.

Having described my invention what I claim is:

In a draw-bar construction the combination with means for attaching the forward end of the draw-bar to a vehicle, a clamp adapted to be clamped upon the front axle of a vehicle to be towed and comprising a part lying above said axle and a part lying below said axle, filling blocks between the part which lies below the axle and said axle, said filling blocks having arcuate faces and the draw-bar having a portion which passes between the axle and the part of the clamp which lies below the axle and the edges of which portion act against said arcuate faces, an extension upon the rear end of the draw-bar, a clamp adapted to be secured to the steering rod of an automobile to be towed and a part carried by said clamp for engaging the extension of the rear end of the draw-bar.

In testimony whereof I affix my signature in the presence of two witnesses.

WILLIAM D. GIDDINGS.

Witnesses:
GEORGE T. MORGAN,
JOHN McPHERSON.